United States Patent
Philip et al.

(10) Patent No.: US 11,681,060 B2
(45) Date of Patent: Jun. 20, 2023

(54) RUGGED HEXAGONAL BORON NITRIDE SOLID STATE DETECTOR

(71) Applicant: Schlumberger Technology Corporation, Sugar Land, TX (US)

(72) Inventors: Olivier Philip, Sugar Land, TX (US); Irina Shestakova, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/335,918

(22) Filed: Jun. 1, 2021

(65) Prior Publication Data
US 2021/0373184 A1 Dec. 2, 2021

Related U.S. Application Data

(60) Provisional application No. 63/033,345, filed on Jun. 2, 2020.

(51) Int. Cl.
*G01T 1/24* (2006.01)
*G01T 3/08* (2006.01)

(52) U.S. Cl.
CPC . *G01T 1/24* (2013.01); *G01T 3/08* (2013.01)

(58) Field of Classification Search
CPC .................................. G01T 1/24; G01T 3/08
See application file for complete search history.

(56) References Cited

U.S. PATENT DOCUMENTS

| 10,120,099 | B2 | 11/2018 | Gicquel et al. | |
|---|---|---|---|---|
| 2009/0057545 | A1* | 3/2009 | Saenger | G01T 3/08 250/269.4 |
| 2017/0125625 | A1* | 5/2017 | Cauffiel | H01L 31/02161 |
| 2017/0133543 | A1* | 5/2017 | Dahal | H01L 21/02562 |
| 2020/0072045 | A1* | 3/2020 | Bramlage | H05K 3/4655 |

OTHER PUBLICATIONS

Marinellinzi et al., (2006) High performance (LiF)-Li-6-diamond thermal neutron detectors. Applied Physics Letters, (4 pages).
Makai et al., Reactor Core Monitoring, Lecture Notes in Energy 58, Chapter 2, (94 pages) https://www.springer.com/cda/content/document/cda . . . /9783319545752-c2 pdf.
Glenn F. Knoll, 1979, "Radiation Detection and Measurement", chapter 14,, section C (41 pages).

\* cited by examiner

*Primary Examiner* — Hugh Maupin
(74) *Attorney, Agent, or Firm* — Frederick Carbone (57) ABSTRACT

Detection of nuclear reactions are accomplished through use of a solid-state detector that uses a hexagonal boron nitride configuration. Metallized areas for the hexagonal boron nitride have a metallized top and bottom area that is pixelated.

18 Claims, 5 Drawing Sheets

RUGGED HEXAGONAL BORON NITRIDE SOLID STATE DETECTOR

CROSS-REFERENCE TO RELATED APPLICATIONS

This application claims priority to U.S. Provisional Application Ser. No. 63/033,345, filed on Jun. 2, 2020, entitled "Rugged Hexagonal Boron Nitride Solid State Detector." The entirety of which is incorporated herein by reference.

FIELD OF THE DISCLOSURE

Aspects of the disclosure relate to the process of detecting nuclear reactions. More specifically, aspects of the disclosure relate to a method and apparatus that use hexagonal boron nitride in a solid-state detector.

BACKGROUND

One important need for oil field service work is the ability to properly conduct a subsurface analysis of soil structures and parameters. Knowing such parameters can often allow engineers the ability to properly design apparatus that will allow for recovery of hydrocarbons on which the modern world relies. Conventional apparatus that are used to conduct such surveys use $^3$He detectors. These detectors provide a fission chamber that is configured to measure a raw number of fission decay over a period of time.

Conventional fission chambers have several drawbacks that hamper their use in field conditions. Conventional fission chambers show a decrease in sensitivity as the sensing material reacts with neutrons. These operational changes occur after long exposures due to buildup of fission products. Conventional fission chambers use enriched uranium in their configuration.

Self-powered detectors are operated in "current mode" where the current generated from beta decay due to neutron interactions in the material is measured. The response time is slow and the response is different for different neutron energy spectra. Thus, an engineer using such conventional fission chambers must be careful to check the time of service that the fission chamber has been used as well as the type of neutron energy spectra that may be encountered in field conditions.

There is a need to provide apparatus and methods that are easier to operate than conventional apparatus and methods.

There is a need to provide both apparatus and methods that are more forgiving in the types of neutron energy spectra that may be experienced in field conditions.

There is a further need to provide apparatus and methods that do not have the drawbacks discussed above regarding service life.

There is a still further need to reduce economic costs associated with operations and apparatus described above with conventional tools such that a detector used in such operations provides an economic benefit compared to conventional apparatus.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an apparatus is disclosed. The apparatus may comprise a H-BN film having a top surface and a bottom surface. The apparatus may further comprise a first metalized plate connected to the top surface of the H-BN film. The apparatus may also comprise a second metalized plate connected to the bottom surface of the H-BN film. Furthermore, the apparatus may comprise a first electrical connection connected to the first metalized plate and a second electrical connection connected to the second metalized plate.

In another embodiment a method of manufacturing a sensor is described. The method may comprise obtaining at least one H-BN film. The method may further comprise one of cutting and shaping the film to a predetermined size. The method may also provide for metallizing a portion of both a top and a bottom face of the film. The method may also provide for establishing at least one electrical connection to the top and bottom metallized portions. The method may also provide for enclosing the H-BN film with the metallized portions of the top and the bottom face of the film and a portion of the at least one electrical connection to the top and bottom metallized portions within a housing.

In one example embodiment, a method of operating a sensor. The method may provide for obtaining at least one H-BN film, wherein the film has a top and bottom face with a metallized portion, wherein each of the top face and the bottom face have an electrical connection at the metallized portions. The method may also provide for applying a voltage difference between the top face and the bottom face. The method may further provide for collecting a charge at the H-BN film. The method may also provide for producing a signal from the H-BN film when the charge is collected.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Recent improvements in the growth of hexagonal boron nitride make this material a suitable candidate for use in solid state detectors for thermal neutrons and other ionizing radiation. The material is a semiconductor with a large bandgap (6.5 eV). When grown using a high proportion of the $^{10}B$ boron isotope, which has a large thermal neutron cross section, charges can be generated in the material due to the thermal neutrons' interactions with $^{10}B$ and the resulting ionization in the lattice.

Results have been published which show consistent improvements, reaching a level indicating that the material is suitable over a large temperature range. In some embodiments, the detection efficiency of a single layer 50 micrometers thick can reach 50%.

Aspects of the disclosure provide for a thermal neutron detector comprised of a hexagonal boron nitride (H-BN or H-$^{10}$BN) layer that has been metallized on both sides and packaged in a hermetically sealed metal ceramic enclosure of the same technology as the diamond detector. This thermal neutron detector design can be used for extreme applications (high temperature and high radiation levels) such as thermal neutron flux monitoring in nuclear fission reactors or for measurements in downhole applications. The current developments for rugged thermal neutron flux detectors involve diamond sensors with conversion layers (usually $^6Li$), which is a delicate and expensive technology. Like the technique used with $^3He$ detectors, a layer of cadmium or another thermal neutron absorber may be used to shield the thermal neutron flux before it reaches the detector and use the detector as an epithermal neutron sensor. The thin layer structure may also be used to produce pixelized sensors comprised of arrays of small metallized individual H-BN layers or larger H-BN surfaces where at least one of the surfaces has been metallized with an array of individual metal layers. Different types of metallizing may be used in the construction, including metallizing using an arc spray process, flame spray process and vacuum metallizing process. There are many benefits to metallizing the surface including creating an apparatus that has increased durability and electrical conductivity. Metallizing also aids in reducing maintenance costs, wherein a robust connection may be established to the film. The metallizing process also allows for the connection to be established with no surface distortion as very little heat is imparted to the substrate. As surface temperature increase is minimal, risk of distortion is therefore low. Prior to metallizing, contact surfaces may be prepared for metallizing by various means to ensure adhesion of the metal to the surface contacted. Such an apparatus may be used, therefore, in high temperature environments as well as high "g" environments where defects may cause structural defect under severe structural loading scenarios.

The sensor may also be used as a thermal neutron flux monitor and positional aid in medical applications where precise radiation doses need to be measured, in boron-neutron radiation therapy. It can also be used in proton radiation therapy, and where the radiation beam needs to be positioned precisely. High energy beams are sufficient to ionize the material and produce a signal.

In other embodiments, embodiments may be used for "in core" measurement for thermal neutron flux as there is sufficient temperature resistance for the material and radiation hardness. Further embodiments may be used as a rugged radiation flux monitor for particle beam monitoring, imaging and positioning. Other aspects may be used as a personal dosimetry device, a portable radiation monitor and in conjunction with a distributed network of detectors for monitoring or deployment in disaster radiation areas.

Aspects of the disclosure provide for growing H-BN layers in pure enough form such that the carrier mobility is maintained to obtain fast signals and that a low level of chemical impurities is present. Such a configuration will provide for a good crystalline structure to minimize the production of dark current at elevated temperatures and to avoid trapping charges. In embodiments, the material is metallized on the top and bottom faces. Non-limiting embodiments may provide a pixelated electrode structure on the charge extraction side. In these embodiments, the metallized material is packaged in a hermetically sealed enclosure made of high temperature rated material (metal/ceramic) with electronic feedthroughs to carry the signal and set a bias voltage.

In embodiments, a high purity high structure quality H-BN or H-$^{10}$BN material layer is provided to create electron/hole pairs from interaction with neutrons or ionizing radiation. The purity and quality of the material are provided for the charges to migrate to the electrodes without being captured and with sufficient speed to produce a fast signal of the highest amplitude. The material purity and quality limit the occurrence of dark current, or flow of charges independent of radiation interaction. The metallization is used to collect the charges. In embodiments, Ni/Au contacts may be used and provided as an ohmic contact.

Figure 1:
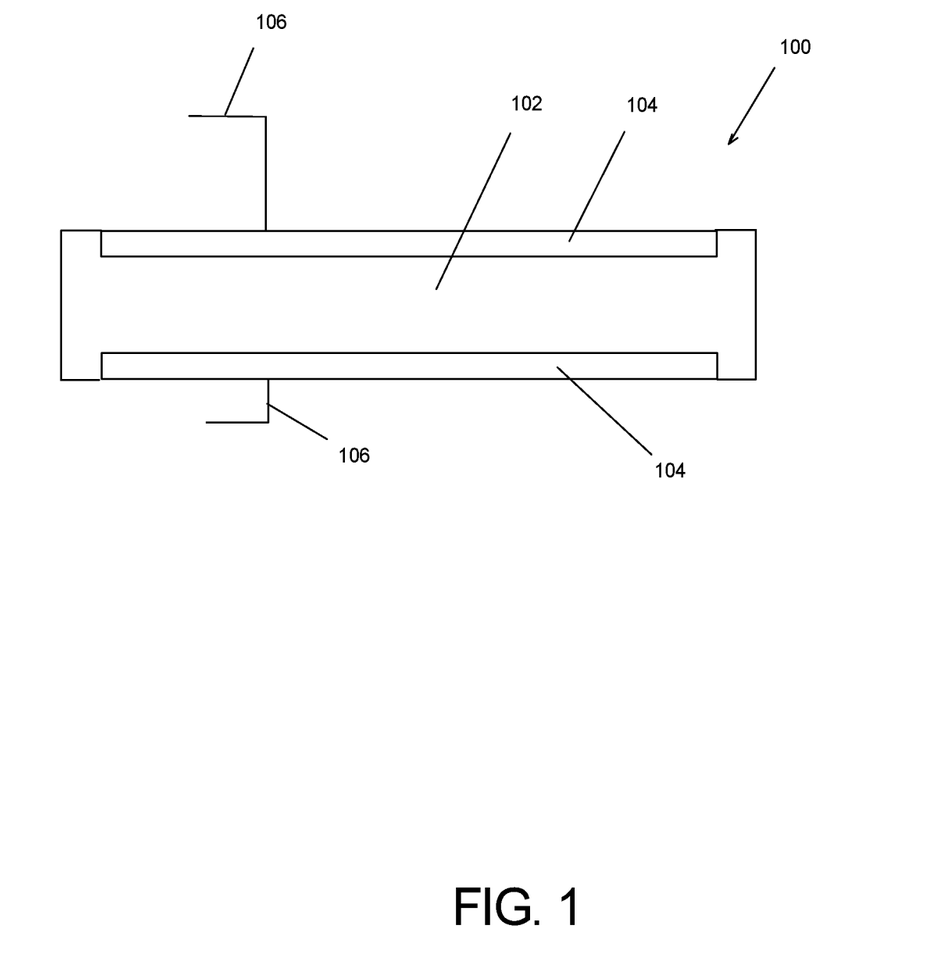
FIG. 1 is a side view of a rugged hexagonal boron nitride solid state detector.

Referring to FIG. 1, a cross-sectional view of an aspect of the disclosure is illustrated. The apparatus 100 includes a H-BN film 102 that is sandwiched between top and bottom metallized areas 104. Separate electrical connections 106 are connected to the top and bottom metallized areas 104.

In the illustrated embodiment in FIG. 1, the thickness of the H-BN film 102 may vary according to the needs of the application. In some embodiments, where thinness is an attractive feature, the H-BN film 102 may be minimized in thickness where packaging in a small volume is necessary. Such small volumes may be used in downhole package integration in oil-field service work, where environments are cramped or at a premium due to small wellbore size. The top and bottom metallized areas 104 may be configured within an indentation provided in the H-BN film 102, thereby providing a flat surface profile. Although illustrated as having an electrical connection 106 at the center of the metallized top and bottom areas 104, other configurations are possible, and the illustrated embodiment is but one example embodiment. Connections may be established through methods that minimize heat generated to the metallized areas 104 such that bending or shrinkage do not occur. Such implementation includes different surface mount technology (SMT), such as ball grid array connections. Surface mount adhesives may be used for adhering the electrical connections 106 to the top and bottom metallized areas 104 until a solder is used for establishing the permanent connection. Permanent connections may be performed through solder reflow technology. In some embodiments, wave soldered connection types may be used. When surface mount adhesives are used, such adhesives may be electrically conductive adhesives, as a non-limiting embodiment.

Figure 2:
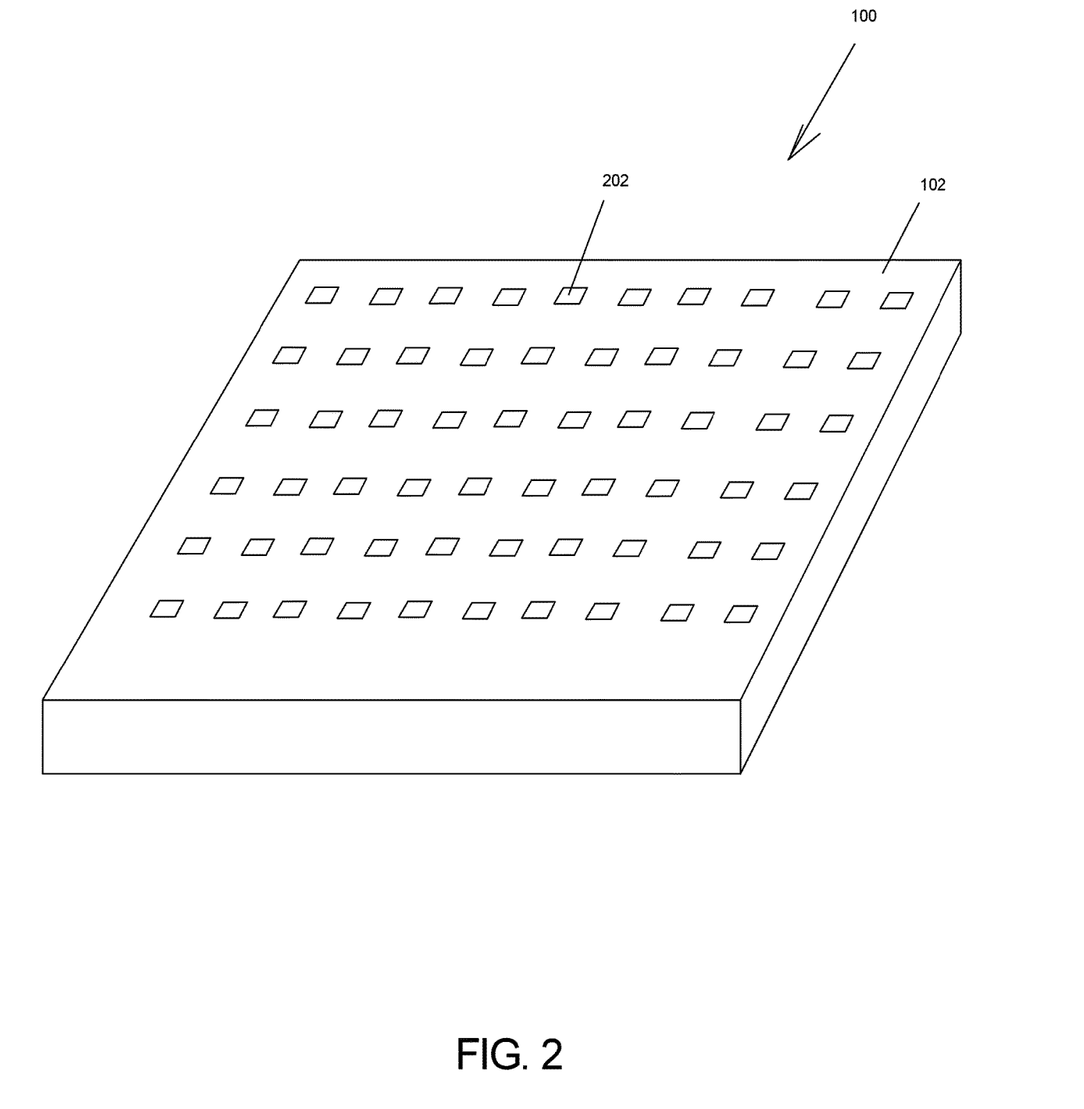
FIG. 2 is a side perspective view of the rugged hexagonal boron nitride solid state detector of FIG. 1, having a pixelated metallized top surface.
Figure 3:
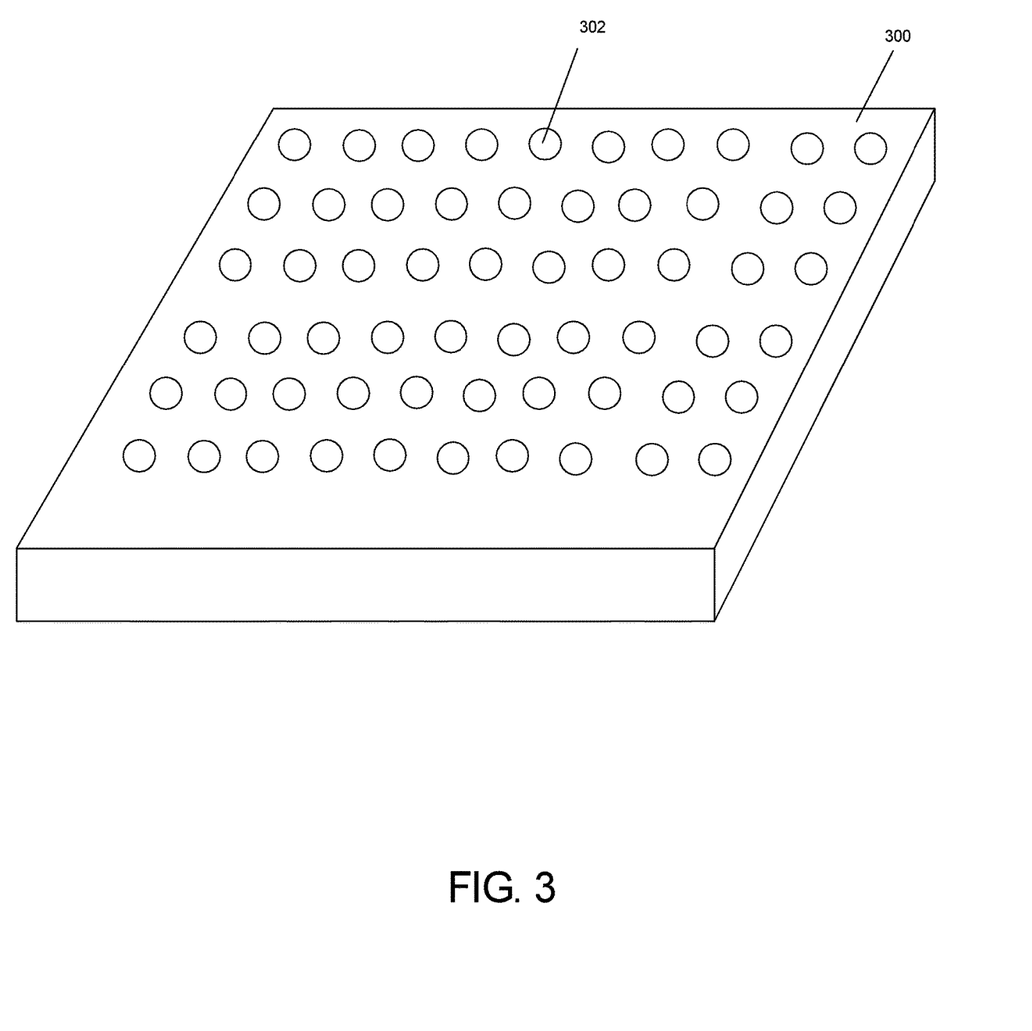
FIG. 3 is a side perspective view of a readout chip with solder bumps to connect to a pixelated electrode.

Referring to FIG. 2, a perspective view of a pixelated metallized face of a H-BN film 102 of FIG. 1 is illustrated. The apparatus 100 has individual pixelated top surface areas 202 placed upon the H-BN film 102 of FIG. 1. Referring to FIG. 3, a receiving part 300 with solder bumps 302 is illustrated. As will be understood, the receiving part 300 is configured with individual solder bumps 302 that align with respective top surface areas 202 placed upon the H-BN film 102, shown in FIG. 2. Under the application of a reflow heat, connection may be established between the receiving part 300 of FIG. 3 and the remainder of the apparatus 100 illustrated in FIGS. 1 and 2.

Once the solder bumps 302 are connected to the pixelated electrodes, at the pixelated metallized top surface, as illustrated in FIG. 2, a connection is established to a preamplifier and signal processing electrodes. Thereafter, once a signal is received at the H-BN film 102, an electrical connection is established such that the signal may be amplified and then read by a signal processing arrangement. Thus, upon a sufficiently strong signal received at the H-BN film 102, specific counts may be read and reported.

Sizing of the sensing areas of the apparatus 100 may be varied according to the application. As the sensing areas are a thin film between two metallized plates, the configuration of a sensor somewhat resembles a capacitor. Capacitance of the sensor may, in some instances, affect the overall signal generated and therefore the effects of such capacitance may be managed for better signal clarity. Such configurations are necessary for larger areas resembling a capacitor, while smaller areas will not have as great a capacitance and therefore the problems associated with such a configuration.

The packaging can vary depending on the application. The only requirement is to have electrical connections to metallized pads on the faces of the H-BN film and to be able to provide a voltage between the electrodes and to extract the current signal. In embodiments, the H-BN film with the metallized portions of the top and the bottom face of the film and a portion of the at least one electrical connection to the top and bottom metallized portions may be enclosed within a housing. This housing may be incorporated into a separate tool, such as a downhole tool, used in oil field services. In other embodiments, the at least one housing has at least one configuration to attach the housing to a wellbore tool. Other embodiments provide for incorporating the housing into a sensor array that may be used in conjunction with monitoring nuclear reactions within a nuclear active environment. In embodiments, the housing may be configured to support the film such that high "g" accelerations do not negatively impact performance of the apparatus. Such configurations are particularly attractive for use in oil field service applications where severe environments may be encountered.

In embodiments, the film may be made flexible and different shapes of detector can be made to conform to the instrument being developed. For example, a curved sensor can be developed to fit into a curved space like a logging tool.

Multiple layers of sensors can be stacked to have enhanced total efficiency at detecting the neutrons. Since the current efficiency of a 50-micron layer is about 50%, several layers can bring the detection efficiency higher.

The charge preamplifier can be integrated in the package with the sensor into a shielded enclosure (from electromagnetic radiation) to minimize noise pickup at the amplifier input and enhance the signal to noise for the detector.

Since the H-BN material is flexible, possible embodiments may produce an entire detector that is flexible or that can be molded or conformed to different shapes depending on the application. The encapsulation of the metallized H-BN material can be done in a flexible dielectric material such as silicone elastomer compounds, or molded into thermoplastic compounds.

Figure 4:
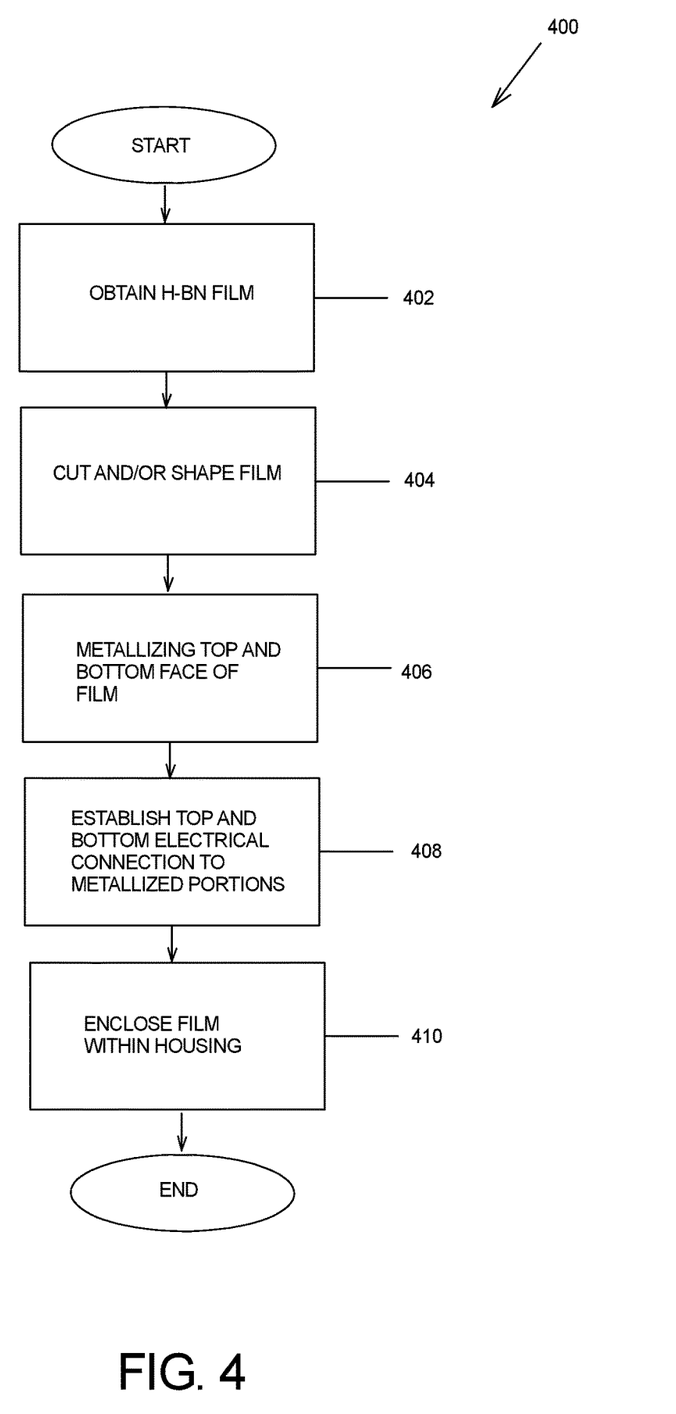
FIG. 4 is a method of producing a H-BN film based apparatus used to detect activity within a nuclear environment.

Referring to FIG. 4, a method 400 is illustrated as one example aspect of the disclosure. At 402, the method provides for obtaining at least one H-BN film. At 404, the method provides for one of cutting and shaping the film to a predetermined size. At 406, the method further comprises metallizing a portion of both a top and a bottom face of the film. At 408, the method provides for establishing at least one electrical connection to the top and bottom metallized portions. At 410, the method still further provides for enclosing the H-BN film with the metallized portions of the top and the bottom face of the film and a portion of the at least one electrical connection to the top and bottom metallized portions within a housing.

Figure 5:
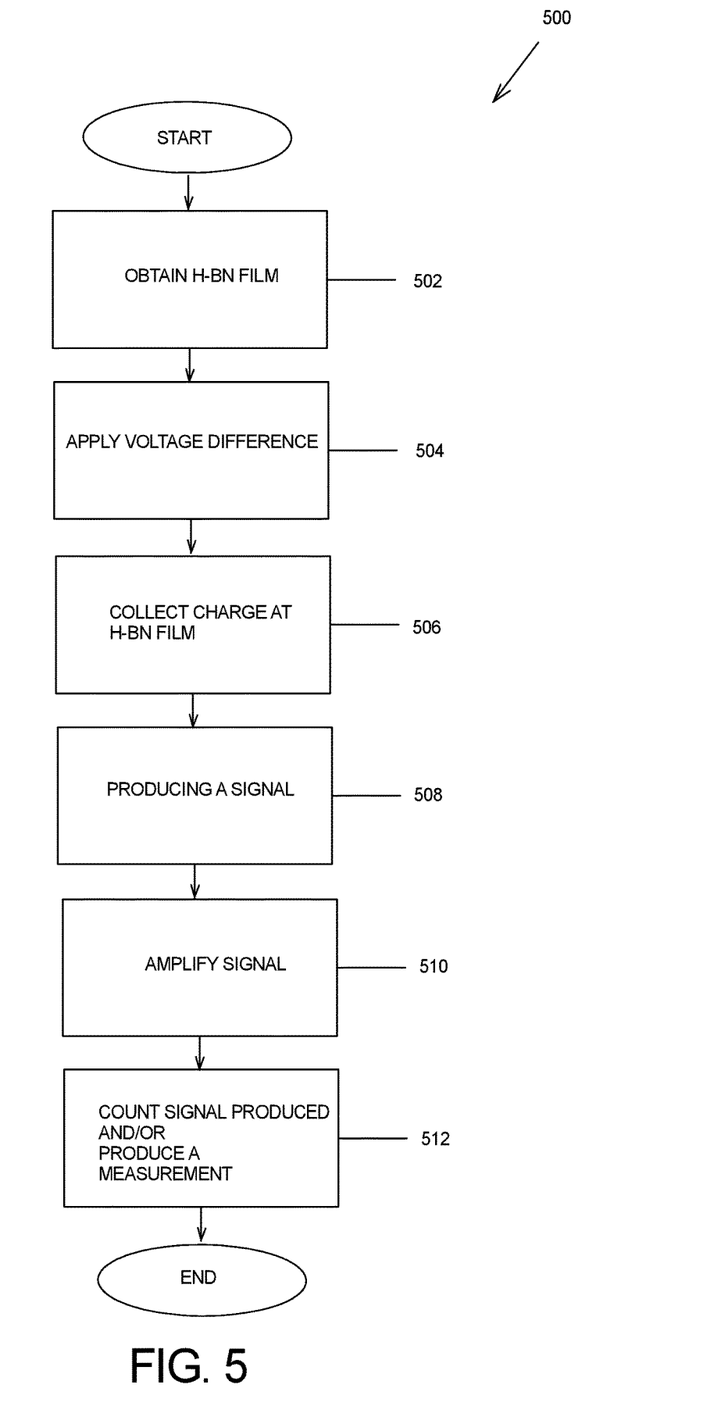
FIG. 5 is a method of performing a count of nuclear reactions using a solid state detector that uses hexagonal boron nitride.

Referring to FIG. 5, a method 500 of operating a sensor is described. At 502, the method provides for obtaining at least one H-BN film, wherein the film has a top and bottom face with a metallized portion, wherein each of the top face and the bottom face have an electrical connection at the metallized portions. At 504, the method continues by applying a voltage difference between the top face and the bottom face. At 506, the method continues by collecting a charge at the H-BN film. At 508, the method continues by producing a signal from the H-BN film when the charge is collected. At 510, the method continues by amplifying the signal, generated at 508. At 512, the method may continue by counting the signals produced and/or producing a measurement of a parameter based upon the count signal produced. As will be understood, the count may be based upon a unit of time basis.

Aspects of the disclosure may be used in oil field services work, specifically the well logging industry. In these embodiments, compact and thin rugged thermal and epithermal detectors may be produced as an alternative technology to conventional $^3$He detectors. In these well logging applications, configurations for a thermal neutron detector, or epithermal neutron detector, a sensor, or sensor array, will provide the information derived similarly from a conventional $^3$He detector without the drawbacks discussed above. These detectors measure the neutron flux away from the source, either AmBe or pulsed neutron generator, after the neutrons have interacted in the formation and the borehole. The fact that the sensitive H-BN layers are very thin allow the production of thin sensor arrays. These configurations allow for sensors that are thin enough, such that they can be co-located with other equipment or sensors. Conventional apparatus do not have this capability.

Other aspects of the disclosure may be used in the nuclear industry. As a non-limiting embodiment, detectors for "in core" measurements of thermal neutron flux. These embodiments are particularly useful as the detectors have a temperature resistance based on the materials used as well as its associated radiation hardness. In these applications, the sensor would provide a signal that is an indication of the thermal neutron flux at the measurement point. As will be understood, reactor parameters subjected to limitations are continually monitored. Reactor operation is based on a number of parameters characterizing the distribution of coolant temperature, power profiles in the fuel assemblies, power density distribution. This "in-core" instrumentation supplies raw data, which are processed, and therefore provide a reactor operator with a log.

Other aspects of the disclosure are possible, such as in the physics instrumentation industry. In one embodiment, rugged radiation flux monitors for particle beam monitoring, imaging and positioning may use the technology disclosed herein.

Other aspects of the disclosure are also possible. One such aspect may be used in the medical industry. These aspects may be used as a dose monitor and for beam diagnostics/monitoring in particle radiation therapy (particle could be neutron, proton or ions).

In radiation monitoring applications, the invention can be used for personal dosimeters, portable radiation monitors and distributed network of detectors for monitoring or deployment in disaster radiation areas for example.

In all of these applications, H-BN detectors may be used in counting mode when the signal is fast enough. These embodiments may provide a stable response with large dynamic range.

In one example embodiment, an apparatus is disclosed. The apparatus may comprise a H-BN film having a top surface and a bottom surface. The apparatus may further comprise a first metalized plate connected to the top surface of the H-BN film. The apparatus may also comprise a second metalized plate connected to the bottom surface of the H-BN film. Furthermore, the apparatus may comprise a first electrical connection connected to the first metalized plate and a second electrical connection connected to the second metalized plate.

In one example embodiment, the apparatus may further comprise an amplifier connected to at least one of the first electrical connection and the second electrical connection.

In another example embodiment, the apparatus may further comprise a signal processing arrangement connected to the amplifier, wherein the signal processing arrangement is configured to receive a signal from the amplifier and produce a processed output.

In another example embodiment, the apparatus may be configured wherein the amplifier is a pre-amplifier.

In another example embodiment, the apparatus may be configured wherein the H-BN film has a first indentation and the first metalized plate is placed within the first indentation to produce a smooth top surface of the apparatus.

In another example embodiment, the apparatus may be configured wherein the H-BN film has a second indentation and the second metalized plate is placed with the second indentation to provide a smooth bottom surface of the apparatus.

In another example embodiment, the apparatus may further comprise at least one housing configured to house the film and at least a portion of the first electrical connection and the second electrical connection.

In another example embodiment, the apparatus may be configured wherein the at least one housing has at least one configuration to attach the housing to a wellbore tool.

In another example embodiment, the apparatus may be configured wherein the housing is configured to withstand at least 5 g acceleration force to the film.

In another example embodiment, a method of manufacturing a sensor is described. The method may comprise obtaining at least one H-BN film. The method may further comprise one of cutting and shaping the film to a predetermined size. The method may also provide for metallizing a portion of both a top and a bottom face of the film. The method may also provide for establishing at least one electrical connection to the top and bottom metallized portions. The method may also provide for enclosing the H-BN film with the metallized portions of the top and the bottom face of the film and a portion of the at least one electrical connection to the top and bottom metallized portions within a housing.

In another example embodiment, the method may be performed wherein the one of the cutting and shaping the film to a predetermined size is cutting the film to fit within an oil field service tool.

In another example embodiment, the method of manufacturing the sensor may be performed wherein the metallizing the portion of the top and bottom face of the film is performed through an arc spray process.

In another example embodiment, the method of manufacturing the sensor may be performed wherein the metallizing the portion of the top and bottom face of the film is performed through a flame spray process.

In one example embodiment, a method of operating a sensor. The method may provide for obtaining at least one H-BN film, wherein the film has a top and bottom face with a metallized portion, wherein each of the top face and the bottom face have an electrical connection at the metallized portions. The method may also provide for applying a voltage difference between the top face and the bottom face. The method may further provide for collecting a charge at the H-BN film. The method may also provide for producing a signal from the H-BN film when the charge is collected.

In another example embodiment, the method may be performed wherein the charge is carried by an electron.

In another example embodiment, the method may further comprise amplifying the signal produced by the H-BN film.

In another example embodiment, the method may further comprise counting each signal produced by the H-BN film.

In another example embodiment, the method may further comprise producing a signal count produced by the H-BN film over a period of time.

In another example embodiment, the method may further comprise producing a measurement based upon the signal count over a time period.

In another example embodiment, the method may be performed wherein a two dimensional response map is developed from a series of measurements from the producing the measurement based upon the signal count over the time period.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An apparatus, comprising:
a H-BN film having a top surface and a bottom surface;
a first metalized plate connected to the top surface of the H-BN film;
a second metalized plate connected to the bottom surface of the H-BN film;
a first electrical connection connected to the first metalized plate; and
a second electrical connection connected to the second metalized plate;
wherein the H-BN film has a first indentation and the first metalized plate is placed within the first indentation to produce a smooth top surface of the apparatus.

2. The apparatus according to claim 1, further comprising:
an amplifier connected to at least one of the first electrical connection and the second electrical connection.

3. The apparatus according to claim 2, further comprising:
a signal processing arrangement connected to the amplifier, wherein the signal processing arrangement is configured to receive a signal from the amplifier and produce a processed output.

4. The apparatus according to claim 2, wherein the amplifier is a pre-amplifier.

5. The apparatus according to claim 1, wherein the H-BN film has a second indentation and the second metalized plate is placed with the second indentation to provide a smooth bottom surface of the apparatus.

6. The apparatus according to claim 1, further comprising:
at least one housing configured to house the film and at least a portion of the first electrical connection and the second electrical connection.

7. The apparatus according to claim 6, wherein the at least one housing has at least one configuration to attach the housing to a wellbore tool.

8. The apparatus according to claim 6, wherein the housing is configured to withstand at least 5 g acceleration force to the film.

9. A method of manufacturing a sensor, comprising:
obtaining at least one H-BN film;
one of cutting and shaping the film to a predetermined size;
metallizing a portion of both a top and a bottom face of the film, wherein metallizing the portion of both the top and the bottom face of the film comprises:
placing a first metalized plate within a first indentation of the film to produce a smooth top surface of the apparatus;
establishing at least one electrical connection to the top and bottom metallized portions; and
enclosing the H-BN film with the metallized portions of the top and the bottom face of the film and a portion of the at least one electrical connection to the top and bottom metallized portions within a housing.

10. The method of manufacturing the sensor according to claim 9, wherein the metallizing the portion of the top and bottom face of the film is performed through an arc spray process.

11. The method of manufacturing the sensor according to claim 9, wherein the metallizing the portion of the top and bottom face of the film is performed through a flame spray process.

12. A method of operating a sensor, comprising:
obtaining at least one H-BN film, wherein the film has a first metalized plate connected to a top surface of the H-BN film, a second metalized plate connected to a bottom surface of the H-BN film, a first electrical connection connected to the first metalized plate, and a second electrical connection connected to the second metalized plate, wherein the H-BN film has a first indentation and the first metalized plate is placed within the first indentation to produce a smooth top surface of the apparatus;
applying a voltage difference between the top face and the bottom face;
collecting a charge at the H-BN film; and
producing a signal from the H-BN film when the charge is collected.

13. The method according to claim 12, wherein the charge is carried by an electron.

14. The method according to claim 12, further comprising:
amplifying the signal produced by the H-BN film.

15. The method according to claim 12, further comprising:
counting each signal produced by the H-BN film.

16. The method according to claim 15, further comprising:
   producing a signal count produced by the H-BN film over a period of time.

17. The method according to claim 15, further comprising:
   producing a measurement based upon the signal count over a time period.

18. The method according to claim 17, wherein a two dimensional response map is developed from a series of measurements from the producing the measurement based upon the signal count over the time period.

* * * * *